H. ROMMERDALE.
CUTTING TOOL.
APPLICATION FILED NOV. 6, 1917.
1,258,815.
Patented Mar. 12, 1918.
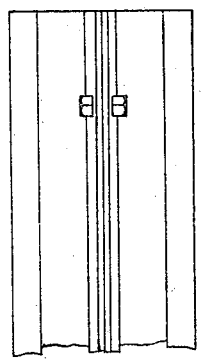
FIG. 1
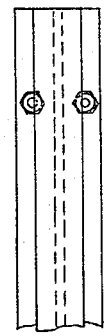
FIG. 2
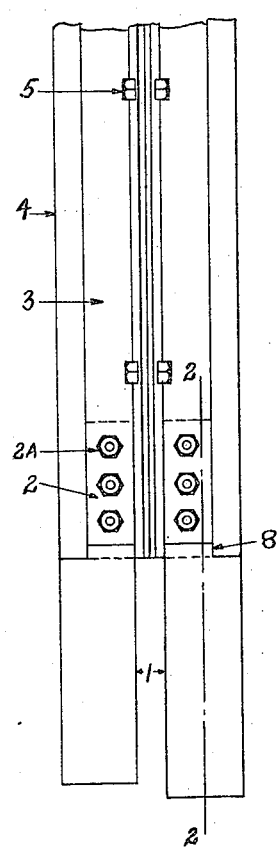
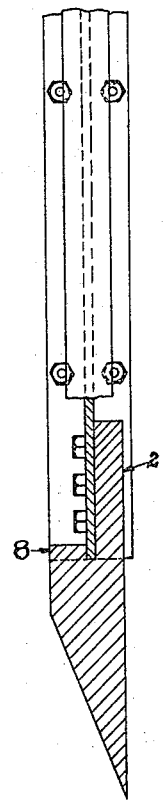
Inventor
Holger Rommerdale
By
Attorney

UNITED STATES PATENT OFFICE.

HOLGER ROMMERDALE, OF ERIE, PENNSYLVANIA.

CUTTING-TOOL.

1,258,815.　　　　　　　　Specification of Letters Patent.　　　Patented Mar. 12, 1918.

Application filed November 6, 1917.　Serial No. 200,603.

*To all whom it may concern:*

Be it known that I, HOLGER ROMMERDALE, a citizen of the United States, residing at Erie, in the county of Erie and State of Pennsylvania, have invented new and useful Improvements in Cutting - Tools, of which the following is a specification.

This invention relates to cutting tools and consists in certain improvements in the construction thereof as will be hereinafter fully described and pointed out in the claims.

The object of the invention is to form a cutting tool capable of being used with pile drivers for cutting rock faces utilizing a standard and comparatively cheap material for the purpose.

The invention is illustrated in the accompanying drawings as follows:—

Figure 1 shows a face view of the cutting tool.

Fig. 2 a section on the line 2—2 in Fig. 1.

1 marks the cutting bit. This is provided with a shank 2 which is bolted by bolts 2ª to the web 3 of the tool shank 4. The tool shank is made up of two railroad rails having their bottoms placed face to face and with the bolts or securing means 5 extending through the bottom flanges.

The bits are provided with the shoulders 8 which extend laterally beyond the web of the rails and engage one of the larger portions of the rails, as shown the tread portion of the rails.

This construction gives a very good support to the cutting bits. At the same time by utilizing railroad rails as the material from which the shank is formed comparatively cheap material is used giving the greatest strength possible to such shank and also providing means to which the bits may be readily attached.

What I claim as new is:—

1. A cutting tool comprising a shank formed of two railroad rails secured together with their bottoms face to face and cutting bits having shanks secured to the rail webs.

2. A cutting tool comprising a shank formed of two railroad rails secured together with their bottoms face to face and cutting bits having shanks secured to the rail webs, said bits having laterally extending shoulders engaging portions of the rail at the sides of the webs.

In testimony whereof I have hereunto set my hand.

HOLGER ROMMERDALE.

Copies of this patent may be obtained for five cents each, by addressing the "Commissioner of Patents, Washington, D. C."